(12) United States Patent
Nakato et al.

(10) Patent No.: US 8,206,873 B2
(45) Date of Patent: Jun. 26, 2012

(54) ELECTROLYTE FOR FUEL CELL, MEMBRANE ELECTRODE ASSEMBLY, FUEL CELL STACK AND FUEL CELL SYSTEM

(75) Inventors: Kunihiro Nakato, Gunma (JP); Atsuo Sonai, Kanagawa (JP)

(73) Assignees: Sanyo Electric Co., Ltd., Osaka (JP); Samsung Electronics Co., Ltd., Gyeonggi-Do (KR); Samsung SDI Co., Ltd., Gyeonggi-Do (KR)

( * ) Notice: Subject to any disclaimer, the term of this patent is extended or adjusted under 35 U.S.C. 154(b) by 1795 days.

(21) Appl. No.: 11/183,168

(22) Filed: Jul. 18, 2005

(65) Prior Publication Data
US 2006/0286425 A1    Dec. 21, 2006

(30) Foreign Application Priority Data
Jul. 21, 2004  (JP) ................. 2004-213077

(51) Int. Cl.
H01M 8/10    (2006.01)
(52) U.S. Cl. .......................... 429/492; 429/493; 429/494
(58) Field of Classification Search .................... 429/30, 429/33, 46, 203, 491–494
See application file for complete search history.

(56) References Cited

U.S. PATENT DOCUMENTS

| | | | | |
|---|---|---|---|---|
| 5,525,436 | A  * | 6/1996 | Savinell et al. | 429/30 |
| 6,197,147 | B1 * | 3/2001 | Bonsel et al. | 156/269 |
| 6,946,211 | B1 * | 9/2005 | Bjerrum et al. | 429/33 |
| 2006/0078774 | A1 * | 4/2006 | Uensal et al. | 429/33 |

FOREIGN PATENT DOCUMENTS

| | | |
|---|---|---|
| JP | 11-503262 | 3/1999 |
| JP | 2005-209520 | 8/2005 |
| KR | 2002-0056117 A | 7/2002 |
| KR | 2003-0032321 A | 4/2003 |
| WO | WO96/13872 | 5/1996 |
| WO | WO 01/18894 A2 | 3/2001 |
| WO | WO 2004/034500 A2 | 4/2004 |

OTHER PUBLICATIONS

Chinese Office Action issued in corresponding Chinese Application No. CN 2005-100847979, dated Apr. 13, 2007.
Japanese Office Action, with English Translation, issued in Japanese Patent Application No. JP 2004-213077 dated on Jul. 15, 2008.
Korean Office Action in corresponding Korean Patent Application No. 10-2005-0041652, dated Jul. 27, 2006.

* cited by examiner

Primary Examiner — Tracy Dove
(74) Attorney, Agent, or Firm — McDermott Will & Emery LLP

(57) ABSTRACT

A solid polymer fuel cell stack has a layered product comprised of a plurality of cells stacked, and is so structured that the layered product is fastened by end plates on both sides thereof via a current collector and an insulating plate on each side. Each cell is structured such that an MEA is sandwiched between an anode-side plate, which is provided with a fuel path disposed counter to an anode of the MEA, and a cathode-side plate, which is provided with an oxidizing agent path disposed counter to a cathode of the MEA. An MEA is comprised of a solid polymer electrolyte membrane, an anode and a cathode. The solid polymer electrolyte membrane is composed of powder of basic polymer such as polybenzimidazole, strong acid such as phosphoric acid impregnated with the basic polymer, and binder such as fluorocarbon resin.

7 Claims, 4 Drawing Sheets

(1)

(2)

(3)

ELECTROLYTE FOR FUEL CELL, MEMBRANE ELECTRODE ASSEMBLY, FUEL CELL STACK AND FUEL CELL SYSTEM

BACKGROUND OF THE INVENTION

1. Field of the Invention

The present invention relates to fuel cells, and it particularly relates to a fuel cell which is operable in the unhumidified conditions.

2. Description of the Related Art

Solid polymer fuel cells in which a solid polymer membrane is used as the electrolyte are known as a type of fuel cells. The solid polymer fuel cells use a proton conductive polymer electrolyte membrane as the electrolyte and generally include an anode (fuel electrode), a cathode (oxidizing agent electrode) and a polymer electrolyte membrane disposed between the anode and the cathode. The anode of a solid polymer fuel cell is provided with a catalyst layer that accelerates the oxidation of the fuel, and the cathode thereof is provided with a catalyst layer that accelerates the reduction of the oxidizing agent.

The fuel to be supplied to the anode of a solid polymer fuel cell is generally hydrogen, hydrogen-containing gas, mixed vapor of methanol and water, aqueous solution of methanol or the like. The oxidizing agent to be supplied to the cathode of a solid polymer fuel cell is generally oxygen, oxygen-containing gas or air.

The material generally used for the polymer electrolyte membrane is sulfonated highly-fluorinated polymer, which has the principal chain composed of fluorinated alkylene and the side chain composed of fluorinated vinyl ether having a sulfonic acid group at the end. This type of polymer electrolyte membrane, impregnated with the supply of an appropriate amount of water, displays sufficient ionic conductivity for generating power.

The conventional solid polymer fuel cells therefore required the moisture control of the polymer electrolyte membrane, which in turn led to the complexity or large size of the fuel cell systems.

In addressing such problems caused by the moisture control of the polymer electrolyte membrane, an unhumidified electrolyte membrane that ensures proton conductivity in unhumidified conditions has been developed as a substitution for the conventional polymer electrolyte membrane.

For example, Reference (1) in the following Related Art List discloses polybenzimidazole doped with phosphoric acid and the like as a material for an unhumidified polymer electrolyte membrane.

RELATED ART LIST (1) Japanese Patent Application Laid-Open No. Hei 11-503262.

The known polymer electrolyte membranes without humidification are characterized by the fact that they are rigid and not easily deformable. Though there is an advantageous aspect of being highly rigid in the unhumidified polymer electrolyte membrane, there are drawbacks where once damage such as cracking in part of the membrane is caused, with a long time of operation, the characteristic as being an ionic conducting membrane is impaired, thus causing problems in terms of durability.

Besides, since it is hard to deform the unhumidified polymer electrolyte, a problem is that its processing is not easy at all.

SUMMARY OF THE INVENTION

The present invention has been made in view of the foregoing circumstances and an object thereof is to improve the durability of unhumidified polymer electrolyte membranes. Another object of the present invention is to provide an unhumidified polymer electrolyte membrane which can be processed with ease.

An electrolyte membrane for a fuel cell according to the present invention contains basic polymer, strong acid and binder. From a viewpoint of durability and improved formability, it is preferable that the basic polymer be in a form of partially complex-structured powder relative to the strong acid. It is further preferable that a volume average particle diameter of the powder of basic polymer be approximately 10 to 100 μm.

The basic polymer used for the electrolyte membrane for a fuel cell is preferably selected from the group consisting of polybenzimidazoles, poly(pyridines), poly(pyrimidines), polyimidazoles, polybenzothiazoles, polybenzoxazoles, polyoxadiazoles, polyquinolines, polyquinoxalines, polythiadiazoles, poly(tetrazapyrenes), polyoxazoles, polythiazoles, polyvinylpyridines and polyvinylimidazoles.

The strong acid used for the electrolyte membrane for a fuel cell is preferably phosphoric acid or sulfuric acid.

The binder used for the electrolyte membrane for a fuel cell is preferably fluorocarbon resin. The above electrolyte membrane for a fuel cell is preferably such that the weight of the binder is approximately 3% to 60% of the total weight of the electrolyte.

A membrane electrode assembly according to the present invention includes: the above-described electrolyte for a fuel cell; an anode which is provided on one surface of the electrolyte; and a cathode which is provided on the other surface of the electrolyte.

A fuel cell stack according to the present invention comprises a plurality of cells stacked, each of the cell including: the above-described membrane electrode assembly; an anode-side plate which is provided with a fuel path disposed counter to the anode of the membrane electrode assembly; and a cathode-side plate which is provided with an oxidizing agent path disposed counter to the cathode of the membrane electrode assembly.

A fuel cell system according to the present invention comprises: a reforming unit which generates hydrogen gas by reforming hydrocarbon fuel; and the above-described fuel cell stack which generates power by using the hydrogen gas supplied from the reforming unit and oxidizing agent.

A method of manufacturing an electrolyte for a fuel cell according to the present invention includes: preparing mixture liquid by adding a solvent to basic polymer and strong acid; forming a complex containing the basic polymer and the strong acid by removing the solvent in the mixture liquid; forming powder containing the basic polymer and the strong acid by pulverizing a resultant mixture from the forming a complex; forming a mixture by mixing the powder with fluorocarbon resin; rolling the mixture into sheets; and heating the sheet-like mixture so as to be dried.

It is to be noted that any arbitrary combination of the above-described components or elements are all effective as the present embodiments and may be encompassed by the scope of claims.

Moreover, this summary of the invention does not necessarily describe all necessary features so that the invention may also be sub-combination of these described features.

DETAILED DESCRIPTION OF THE INVENTION

The invention will now be described based on preferred embodiments which do not intend to limit the scope of the present invention but exemplify the invention. All of the features and the combinations thereof described in the embodiments are not necessarily essential to the invention.

A solid polymer electrolyte membrane according to an embodiment of the present invention contains basic polymer, strong acid and binder.

The basic polymer is preferably to be selected from the group consisting of polybenzimidazoles, poly(pyridines), poly(pyrimidines), polyimidazoles, polybenzothiazoles, polybenzoxazoles, polyoxadiazoles, polyquinolines, polyquinoxalines, polythiadiazoles, poly(tetrazapyrenes), polyoxazoles, polythiazoles, polyvinylpyridines and polyvinylimidazoles. Of these, the most preferably used is the group of polybenzimidazoles. The polybenzimidazole group is expressed by the chemical formula (1) in FIG. 4.

Figure 4:
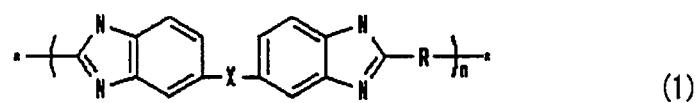
FIG. 4 shows chemical formulae (1), (2) and (3).
Figure 4:
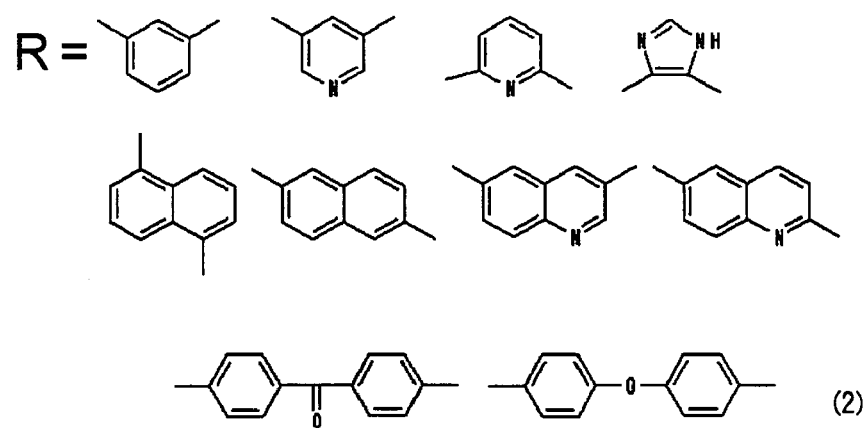
Figure 4:
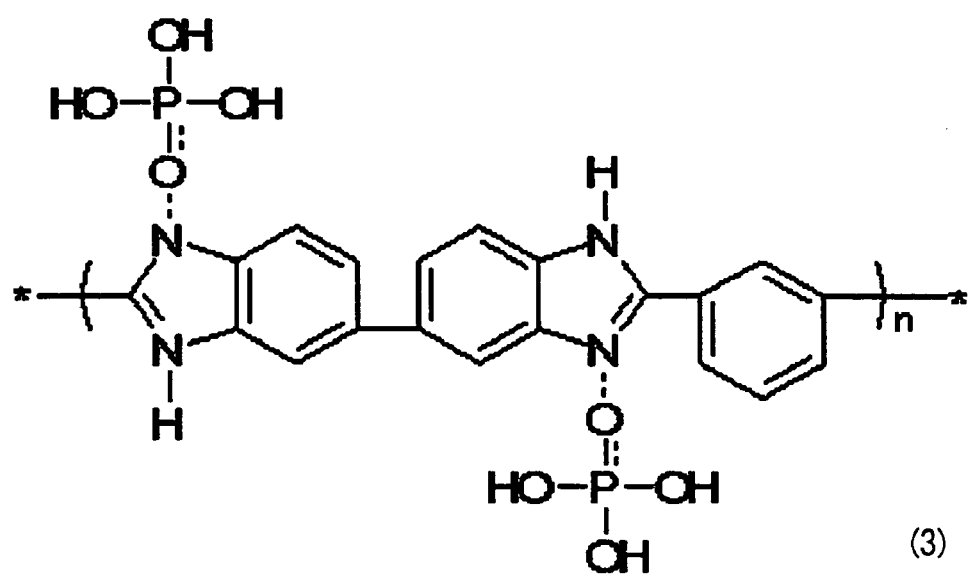

In the general formula (1) shown in FIG. 4, X is selected from —O—, —$SO_2$—, —$C(CH_3)_2$—, —$C(CF_3)_2$—, —OPhO— or a direct bond. R is to include any of substituents (2) shown in FIG. 4.

From the viewpoint of polymer characteristics, such as mechanical strength or viscosity, the weight-average molecular weight of the basic polymer is preferably in the range of 1,000 to 1,000,000 or more preferably in the range of 200,000 to 500,000. The weight-average molecular weight of less than 1,000 may lead to an insufficient mechanical strength of the electrolyte obtained, and the weight-average molecular weight of more than 1,000,000 causes a drop in the solubility with the solvent, thus making the forming of the solid polymer electrolyte membrane difficult. The weight-average molecular weight of the basic polymer can be measured by any of known methods including gel permeation chromatography (GPC).

The basic polymer is preferably in the form of powder, and the volume average particle diameter of the basic polymer powder is preferably 10 to 100 μm. Whereas the particle size of larger than 100 μm impairs durability and formability, that of less than 10 μm increases the manufacturing cost.

The strong acid to be selected is, for example, an inorganic acid, such as phosphoric acid or sulfuric acid. In the case where phosphoric acid is used as the strong acid, it is preferable that the concentration thereof is approximately 85 to 122 (% $H_3PO_4$). If the concentration of phosphoric acid is lower than 85 (% $H_3PO_4$), insufficient ionic conductivity is caused, whereas if the concentration thereof is higher than 122 (% $H_3PO_4$), the liquid viscosity is raised, thus resulting the difficulty of manufacturing.

The weight of the strong acid is preferably 5% to 99.9% of the total weight of the basic polymer and the strong acid. The weight of the strong acid of less than 5% causes insufficient ionic conductivity, whereas that of more than 99.9% promotes gelatinization, thus impairing the function of a solid polymer electrolyte membrane.

Figure 1:
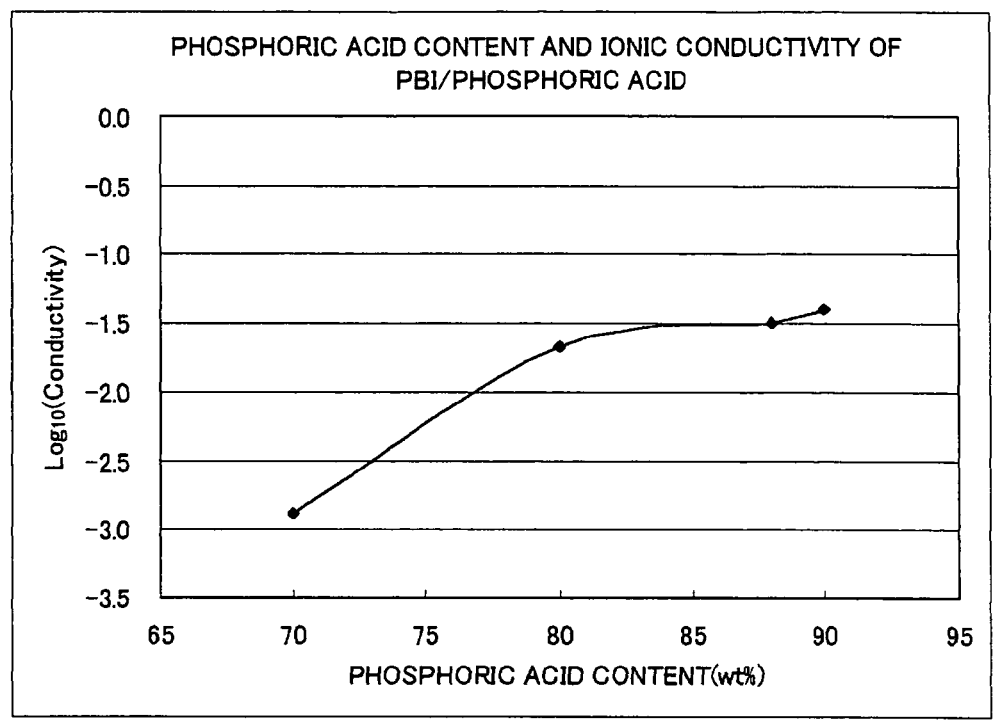
FIG. 1 illustrates a relationship between phosphoric acid content and ionic conductivity.

FIG. 1 illustrates a relationship between the phosphoric acid content and ionic conductivity of a polymer electrolyte membrane (thickness: 200 μm) which is PBI (volume average particle diameter: 50 μm) and phosphoric acid solidified by polytetrafluoroethylene. As is evident from FIG. 1, the ionic conductivity is held at a high level in the region where the phosphoric acid content is higher than 80 wt %.

Part of the strong acid is chemically bonded to the basic polymer, while the rest thereof is released into the solid polymer electrolyte membrane. For example, in a solid polymer electrolyte membrane of a polybenzimidazole (hereinafter referred to as PBI) doped with phosphoric acid, the phosphoric acid is chemically bonded with the polybenzimidazole to form a PBI/phosphoric acid complex as expressed by the general formula (3) in FIG. 4.

There is the excess phosphoric acid around the PBI/phosphoric acid complex. The PBI/phosphoric acid complex, together with the excess phosphoric acid, makes proton conduction possible.

A solid polymer electrolyte membrane according to an embodiment displays greater bendability and flexibility than a solid polymer electrolyte membrane of a basic polymer alone because the powdery basic polymer thereof and the phosphoric acid impregnated into the basic polymer are solidified by a binder. The binder is preferably a fluorocarbon resin, the examples of which include polytetrafluoroethylene (PTFE), tetrafluoroethylene-hexafluoropropyrene copolymer (FEP), perfluoroethylene (PFA) and polyvinylidene fluoride (PVDF). The weight of the binder is preferably 3% to 60% of the total weight of the electrolyte for use in a fuel cell. If the weight of the binder is less than 3% of the total weight of the electrolyte for a fuel cell, the binding performance will drop, thus rendering the forming of a solid polymer electrolyte membrane difficult. On the other hand, if the weight of the binder exceeds 60% of the total weight of the electrolyte for a fuel cell, the resistance will increase and the ionic conductivity will drop, thus resulting in the insufficient performance of the solid polymer electrolyte membrane.

The solid polymer electrolyte membrane structured as above exhibits both chemical and thermal stability at high temperatures of 100° C. and above and has sufficient ionic conductivity for generating power in unhumidified conditions. As a result, moisture control of the solid polymer electrolyte membrane is not required, and problems related to such moisture control are eliminated.

Moreover, the solid polymer electrolyte membrane according to the present invention, which is flexible, is less susceptible to damage such as cracking and is therefore highly durable. Moreover, the solid polymer electrolyte membrane according to the present invention is easy to form, so that time and efforts required to process it into a desired form or in a thinner membrane will be significantly reduced.

Figure 2:
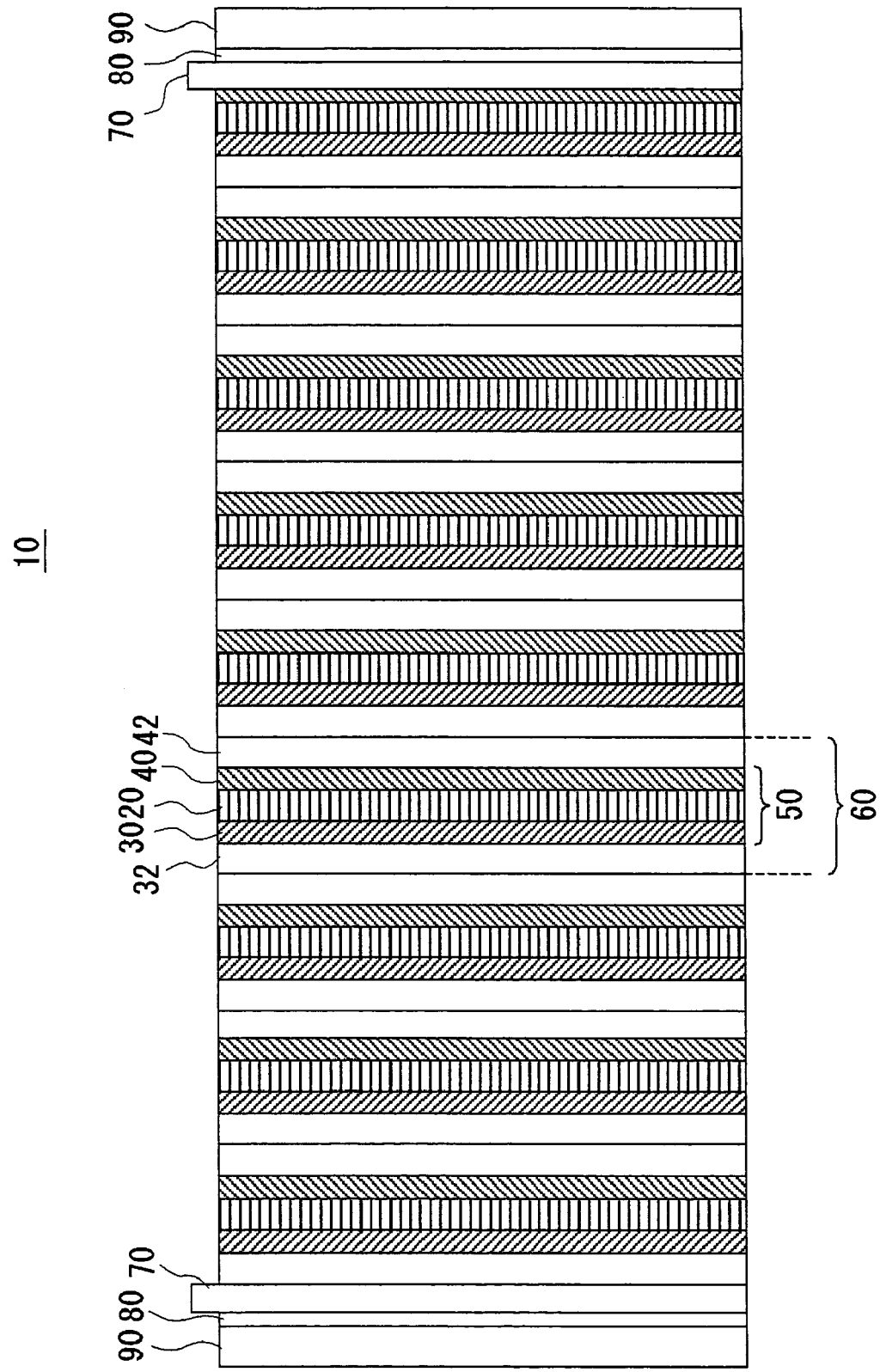
FIG. 2 shows a structure of a fuel cell stack according to an embodiment of the present invention.

FIG. 2 outlines a solid polymer fuel cell stack using the above-described solid polymer electrolyte membrane. A solid polymer fuel cell stack 10 includes a layered product comprised of a plurality of cells 60 stacked, each of which includes a membrane electrode assembly 50 (hereinafter referred to as "MEA"). And the solid polymer fuel cell stack 10 is so structured that the layered product is fastened by end plates 90 on both sides thereof via a current collector 70 and an insulating plate 80 on each side. The MEA 50 is structured such that an anode 30 is joined to one surface of a solid polymer electrolyte membrane 20 according to the present invention and a cathode 40 is joined to the other surface thereof. The anode 30 and the cathode 40, which are made mainly of carbon supporting platinum, provide reaction site with a diffusion path capable of diffusing gas. The cell 60 is structured such that the MEA 50 is sandwiched between an anode-side plate 32, which is provided with a fuel path disposed counter to the anode 30 of the MEA 50, and a cathode-side plate 42, which is provided with an oxidizing agent path disposed counter to the cathode 40 of the MEA 50. A cooling water conduit for passing cooling water as needed may be provided in the surface(s) of the anode-side plate 32 and/or the cathode-side plate 42 opposite to the MEA 50. In a cell 60 structured as described above, hydrogen gas introduced into the anode 30 via the fuel path in the anode-side plate 32 is oxidized in the anode 30 to become protons (H+), and the protons then migrate through the solid polymer electrolyte membrane 20 to reach the cathode 40, in which they are reduced to water through their electrochemical reaction with oxygen in the air introduced therein via the oxidizing agent path in the cathode-side plate 42. As a result of this electrochemical reaction, a direct-current power is generated between the anode 30 and the cathode 40.

Figure 3:
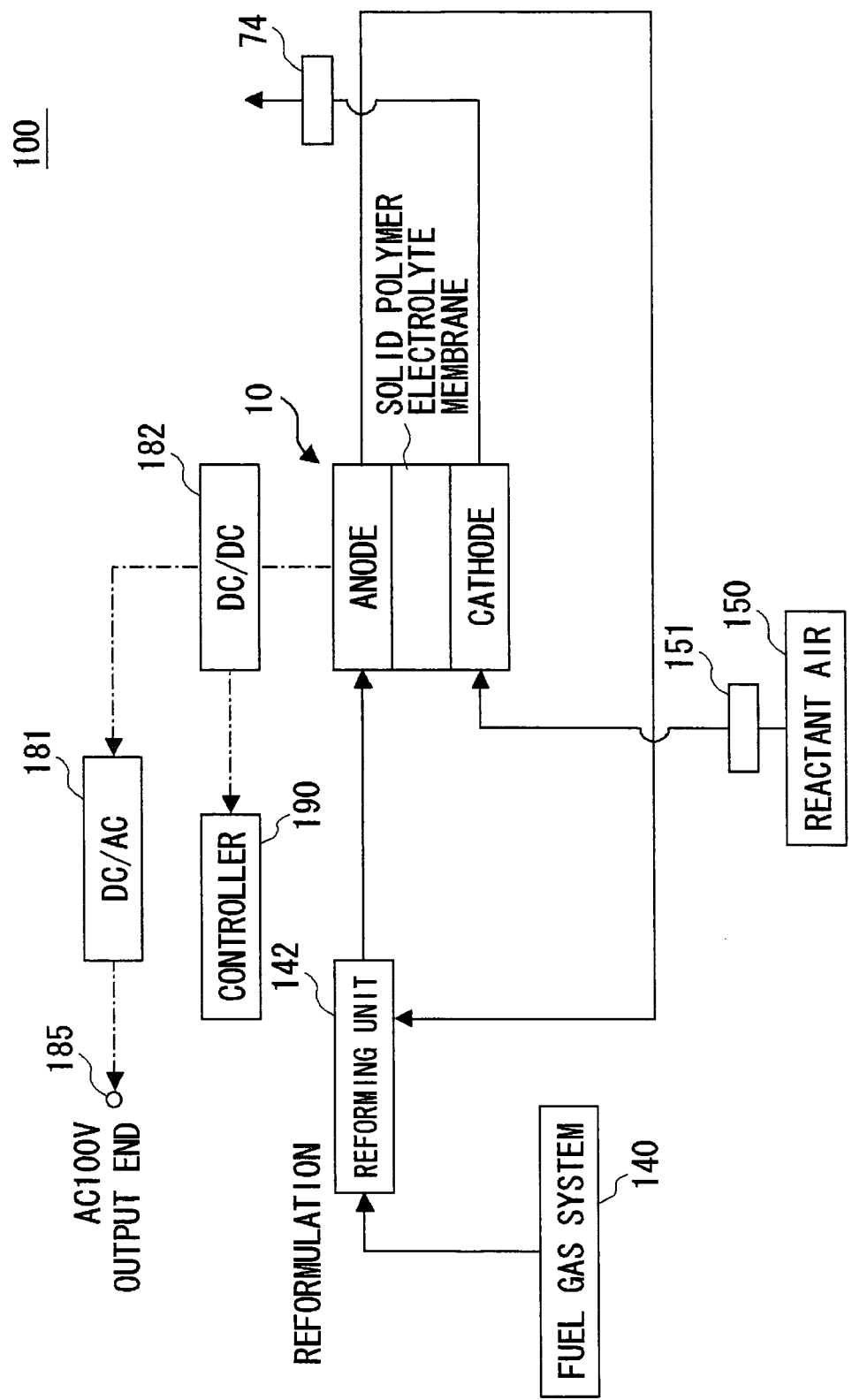
FIG. 3 illustrates a structure of a fuel cell system according to an embodiment of the present invention.

FIG. 3 illustrates a general structure of a solid fuel cell system using the above-described polymer fuel cell stack. A solid polymer fuel cell system 100 generates direct-current power by supplying hydrogen gas, which is obtained by reforming a hydrocarbon fuel gas, and reactant air to a solid polymer fuel cell stack 10 shown in FIG. 2, where an electrochemical reaction takes place between hydrogen and oxygen contained in the reactant air.

The hydrogen gas is obtained by reforming the hydrocarbon fuel gas supplied from a fuel gas system 140 through steam reforming in a reforming unit 142. The hydrogen gas obtained in the reforming unit 142 is supplied to the fuel path in the anode-side plate 32 of each cell 60 in the solid polymer fuel cell stack 10.

On the other hand, reactant air 150 is sent in by a blower 151 and then an appropriate amount thereof is supplied to the oxidizing agent path in the cathode-side plate 42 of each cell 60 in the solid polymer fuel cell stack 10.

Unused hydrogen gas, which has not been used in the reaction in the solid polymer fuel cell stack 10, is supplied to the reforming unit 142, where it is utilized as fuel to provide heat. On the other hand, unused reactant air, which has not been used in the reaction in the solid polymer fuel cell stack 10, is sent to an exhaust duct 74.

Direct-current power generated in the solid polymer fuel cell stack 10 is converted into a direct-current power of a predetermined voltage by a DC/DC converter 182 and then converted into an alternating-current power (100 V for instance) by a DC/AC inverter 181. The AC power, after the conversion in the DC/AC inverter 181, is outputted to an output end 185. The DC power of a predetermined voltage, after the conversion in the above-mentioned DC/DC converter 182, is also used as a power source for a controller 190 and the like.

The controller 190 performs various control of the solid polymer fuel cell system 100. That is, the controller 190 controls the solid polymer fuel cell stack 10, the blower 151, the DC/AC inverter 181, the DC/DC converter 182 and the like through sending and receiving electrical signals therebetween.

Conventional solid polymer fuel cell systems have been in need of some means to humidify the fuel and/or the oxidizing agent so as to keep the electrolyte membrane in humid conditions. The solid polymer fuel cell system 100 according to the present invention, however, provides ionic conduction by the solid polymer electrolyte membrane 20 in unhumidified conditions and therefore does not require any means to humidify the fuel and/or the oxidizing agent, thus achieving simplified system structuring, reduced volume and reduced cost.

Reforming units used in conventional solid polymer fuel cell systems are generally comprised of a desulfurizer, which removes sulfur compounds from fuel gas, a steam reforming unit, which produces hydrogen through a reaction between fuel gas and water, a CO transformer, which changes CO (carbon monoxide) into $CO_2$ (carbon dioxide) and $H_2$ (hydrogen) in a reaction between CO and water, and a CO remover, which removes CO having remained in the CO reforming unit through selective oxidization. With a solid polymer fuel cell system 100 according to the present invention, however, there is little effect of poisoning by CO, so that the reforming unit has no need for a CO remover. Hence, it is possible to make the reforming unit smaller and reduce cost.

Fabrication of Solid Polymer Electrolyte Membrane 10 wt % of PBI solution was prepared by adding 10 grams of PBI (weight-average molecular weight: about 70,000) to 90 grams of N,N'-dimethylacetoamide. At room temperature, 100 grams of 10 wt % PBI solution was added gradually with stirring to 90 grams of 115% phosphoric acid in a 200-ml beaker. The mixture thus obtained was dried at 170° C. for 2 to 3 days to remove remaining N,N'-dimethylacetoamide. Then a solid material containing PBI and phosphoric acid was pulverized by a jet mill. The volume average particle diameter of the resultant powder, measured by a particle diameter distribution measuring unit, was 50 μm. It is to be noted that a powder of a desired volume average particle diameter can be obtained by breaking up the above-mentioned powder with a blowing-type classifier after the solid material containing PBI and phosphoric acid has been pulverized by a jet mill.

Next, 15 grams of the powder containing PBI and phosphoric acid obtained in the above-described process and 3 grams of PTFE were wet-blended at room temperature. The resultant mixture was rolled in a rolling machine into a sheet of approximately 200 μm in thickness. This sheet was dried at 120° C. for 2 to 3 hours to remove remaining solvent, thus producing solid polymer electrolyte membranes.

Evaluation

The membrane electrode assemblies produced according to the above procedures were incorporated into a solid polymer fuel cell stack 10 as shown in FIG. 2, and the ionic conductivity was measured. A 4-probe conductivity measuring instrument was used for measuring the ionic conductivity, and the measurement was made with conditions where the frequency is in the range of 1 Hz to 100 k Hz and the voltage is 100 mV. As a result thereof, the ionic conductivity of about $10^{-1}$ S/cm was obtained in 150° C. and unhumidified conditions. This ionic conductivity was maintained for at least 1000 hours. When the solid polymer electrolyte membrane was observed with eyes after measuring the ionic conduction, no abnormality such as cracking was observed.

The present invention has been described based on the embodiments which are only exemplary and is thus not limited thereto. It is understood that there exist other various kinds of modifications such as design modifications based on the knowledge of those skilled in the art and there also exist any other various modifications to the combination of each component and process described above, and that such modifications as well as embodiments with the modifications implemented thereto are encompassed by the scope of the present invention which is defined by the appended claims.

What is claimed is:

1. An electrolyte, for a fuel cell, which contains basic polymer, strong acid and binder, the binder comprising a fluorocarbon resin selected from the group consisting of polytetrafluoroethylene (PTFE), tetrafluoroethylene-hexafluoropropyrene copolymer (FEP), perfluoroethylene (PFA) and polyvinylidene fluoride (PVDF),
wherein the basic polymer is in a form of powder, and a volume average particle diameter of the powder is approximately 10 to 100 μm.

2. An electrolyte according to claim 1, wherein the basic polymer is selected from the group consisting of polybenzimidazoles, poly(pyridines), poly(pyrimidines), polyimidazoles, polybenzothiazoles, polybenzoxazoles, polyoxadiazoles, polyquinolines, polyquinoxalines, polythiadiazoles, poly(tetrazapyrenes), polyoxazoles, polythiazoles, polyvinylpyridines and polyvinylimidazoles.

3. An electrolyte according to claim 1, wherein the strong acid is phosphoric acid or sulfuric acid.

4. An electrolyte according to claim 1, wherein the weight of the binder is approximately 3% to 60% of the total weight of the electrolyte.

5. A membrane electrode assembly including:
   an electrolyte, for a fuel cell, which contains basic polymer, strong acid and binder wherein the basic polymer is in a form of powder and a volume average particle diameter of the powder is approximately 10 to 100 µm, and the binder comprises a fluorocarbon resin selected from the group consisting of polytetrafluoroethylene (PTFE), tetrafluoroethylene-hexafluoropropyrene copolymer (FEP), perfluoroethylene (PFA) and polyvinylidene fluoride (PVDF);
   an anode which is provided on one surface of said electrolyte; and
   a cathode which is provided on the other surface of said electrolyte.

6. A fuel cell stack, comprising a plurality of cells stacked, each of the cell including:
   a membrane electrode assembly including:
      an electrolyte, for a fuel cell, which contains basic polymer, strong acid and binder wherein the basic polymer is in a form of powder and a volume average particle diameter of the powder is approximately 10 to 100 µm, and the binder comprises a fluorocarbon resin selected from the group consisting of polytetrafluoroethylene (PTFE), tetrafluoroethylene-hexafluoropropyrene copolymer (FEP), perfluoroethylene (PFA) and polyvinylidene fluoride (PVDF);
      an anode which is provided on one surface of the electrolyte; and
      a cathode which is provided on the other surface of the electrolyte;
   an anode-side plate which is provided with a fuel path disposed counter to the anode of said membrane electrode assembly; and
   a cathode-side plate which is provided with an oxidizing agent path disposed counter to the cathode of said membrane electrode assembly.

7. A fuel cell system, comprising:
   a reforming unit which generates hydrogen gas by reforming hydrocarbon fuel; and
   a fuel cell stack which generates power by using the hydrogen gas supplied from said reforming unit and oxidizing agent, the fuel cell stack including a plurality of cells stacked, each of the cell including:
      a membrane electrode assembly including: an electrolyte, for a fuel cell, which contains basic polymer, strong acid and binder, the basic polymer being in a form of powder, and the binder comprising a fluorocarbon resin selected from the group consisting of polytetrafluoroethylene (PTFE), tetrafluoroethylene-hexafluoropropyrene copolymer (FEP), perfluoroethylene (PFA) and polyvinylidene fluoride (PVDF); an anode which is provided on one surface of the electrolyte; and a cathode which is provided on the other surface of the electrolyte;
      an anode-side plate which is provided with a fuel path disposed counter to the anode of said membrane electrode assembly; and
      a cathode-side plate which is provided with an oxidizing agent path disposed counter to the cathode of said membrane electrode assembly, wherein
   a volume average particle diameter of the powder is approximately 10 to 100 µm.

* * * * *